United States Patent
Kravitz

(10) Patent No.: US 7,339,659 B1
(45) Date of Patent: Mar. 4, 2008

(54) METHOD AND SYSTEM FOR IDENTIFYING HOSTILE MISSILE LAUNCH LOCATIONS

(75) Inventor: Arnold Kravitz, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 53 days.

(21) Appl. No.: 11/470,860

(22) Filed: Sep. 7, 2006

(51) Int. Cl.
*G01B 11/26* (2006.01)
(52) U.S. Cl. ............... 356/152.1; 342/29; 244/3.15
(58) Field of Classification Search ........... 356/152.1
See application file for complete search history.

(56) References Cited

U.S. PATENT DOCUMENTS

2002/0196339 A1* 12/2002 Heafitz .................. 348/144
2005/0240378 A1* 10/2005 Smith et al. ............. 702/188
2007/0052806 A1* 3/2007 Bnayahu et al. .......... 348/155

\* cited by examiner

*Primary Examiner*—Thomas H. Tarcza
*Assistant Examiner*—Tim Brainard
(74) *Attorney, Agent, or Firm*—Dillon & Yudell LLP; Antony P. Ng

(57) ABSTRACT

A method for identifying hostile missile launch locations is disclosed. In response to a receipt of a message containing information regarding a hostile missile had been launched at an aircraft, a determination is made as to whether or not a tail number contained within the message is a valid tail number for the aircraft. If the tail number contained within the message is a valid tail number for the aircraft, another determination is made as to whether or not the aircraft was at a valid location at the time the message was sent. If the aircraft was at a valid location at the time said message was sent, pertinent information are retrieved from the message in order to identify the exact launch location of the hostile missile.

18 Claims, 3 Drawing Sheets

METHOD AND SYSTEM FOR IDENTIFYING HOSTILE MISSILE LAUNCH LOCATIONS

BACKGROUND OF THE INVENTION

1. Technical Field

The present invention relates to surveillance systems in general, and in particular to surveillance systems for identifying locations from which hostile missiles were launched. Still more particularly, the present invention relates to a surveillance system for identifying locations from which hostile land-to-air missiles were launched at aircrafts.

2. Description of Related Art

Surface-to-air missiles, including man-portable air defense systems (MANPADS), can pose a threat to aircrafts that are within the effective range of such missiles. For example, certain MANPADSs such as Stingers and SA series missiles, have altitude and horizontal (or slant) ranges of up to 15,000 feet and four miles, respectively, and can consequently threaten aircrafts come within those ranges. Because aircrafts typically fly below 15,000 feet for as far as 50 miles before landing and after taking off in so-called landing corridors, surface-to-air missiles within the landing corridors can be threats to aircrafts.

With the recent substantial increase in terrorism activities directed towards commercial airliners, one of the current Homeland Security initiatives is to try to identify a location from which a hostile land-to-air missile was launched very soon after the launch of the missile had been established. Such information can be utilized by the local authority to locate and apprehend the attackers.

The present disclosure describes a surveillance system for identifying locations from which hostile land-to-air missiles were launched at aircrafts.

SUMMARY OF THE INVENTION

In accordance with a preferred embodiment of the present invention, in response to a receipt of a message containing information regarding a hostile missile had been launched at an aircraft, a determination is made as to whether or not a tail number contained within the message is a valid tail number for the aircraft. If the tail number contained within the message is a valid tail number for the aircraft, another determination is made as to whether or not the aircraft was at a valid location at the time the message was sent. If the aircraft was at a valid location at the time said message was sent, pertinent information are retrieved from the message in order to identify the exact launch location of the hostile missile.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
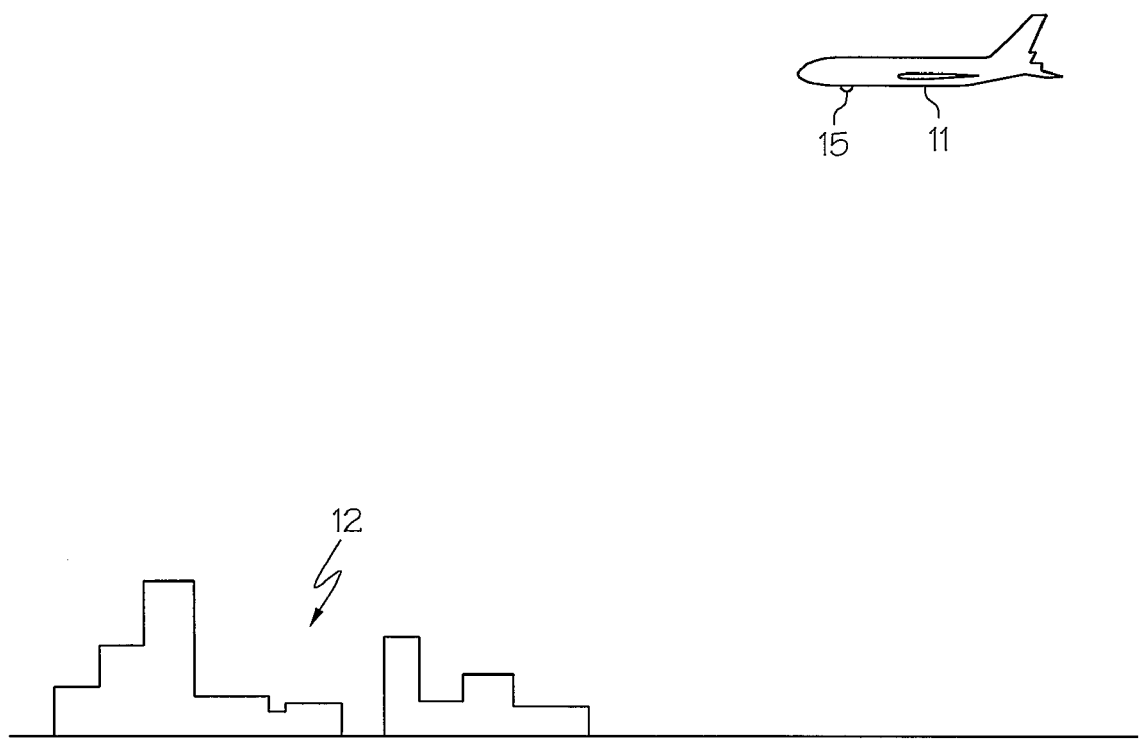
FIG. 1 is a diagram of an environment in which a preferred embodiment of the present invention is applicable.

Referring now to the drawings and in particular to FIG. 1, there is illustrated a diagram of an environment in which a preferred embodiment of the present invention is applicable. As shown, a aircraft 11 flies over an urban environment 12 that typically includes roads, streets, bridges, houses, high-rises, etc. A hostile surface-to-air missile, which is a potential threat to aircraft 11, can be launched from anywhere within urban environment 12.

A surveillance system can be installed on aircraft 11 for gathering information in order to assist the identification of a location within urban environment 12 from which a hostile land-to-air missile has been launched at aircraft 11. The surveillance system includes a camera 15 along with a flight information module (not shown). Camera 15, preferably located at the lower portion of the fuselage of aircraft 11, is equipped with a hyper-hemisphere lens having a view angle of preferably 185°×185° and a resolution of preferably 17.4 milli radian. Camera 15 is capable of capturing visible and/or infra-red video images of a local terrain, such as urban environment 12, at a minimum rate of 30 frames per second.

Figure 2:
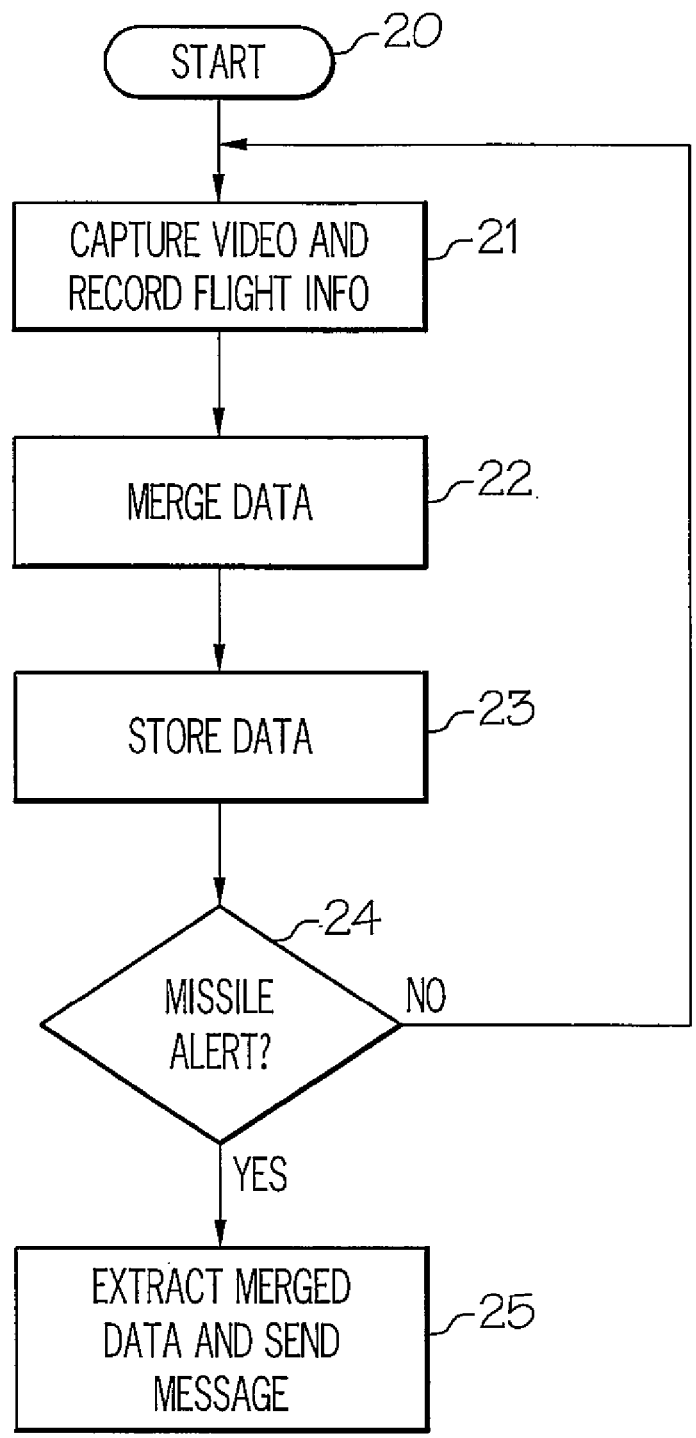
FIG. 2 is a high-level logic flow diagram of a method for capturing video information by a surveillance system, in accordance with a preferred embodiment of the present invention.

With reference now to FIG. 2, there is depicted a high-level logic flow diagram of a method for gathering information by the surveillance system, in accordance with a preferred embodiment of the present invention. Starting at block 20, video images are continuously captured by camera 15 (from FIG. 1) while flight information are recorded by the flight information module, as shown in block 21. The recorded flight information may include global positioning system (GPS) information of an aircraft, flight time, flight velocity, orientation (in roll, pitch and yaw) of the aircraft, angular rate (in roll, pitch and yaw) of the aircraft, camera bore sight orientation (in roll, pitch and yaw), etc. The recorded flight information along with the state vector and tail number of the aircraft are then merged with the video images captured by camera 15, as depicted in block 22. Specifically, the recorded flight information along with the state vector and tail number of the aircraft are embedded in each of the corresponding frame of the captured video images.

The merged data are then written to a high-speed storage device, such as a memory device or a hard drive, as shown in block 23. In order to save space within the high-speed storage device, some of the older merged data will be written over by the newer merged data using a first-in-first-out scheme.

A determination is then made as to whether or not a missile alert has been received, as depicted in block 24. The missile alert can be provided via an alert signal from a missile warning system installed within the aircraft. If there is no receipt of a missile alert, the process returns to block 21 for continue video capturing. However, if a missile alert has been received, the most recent merged data are retrieved from the storage device and are then sent to a secured web address via a secured email message, as shown in block 25.

Figure 3:
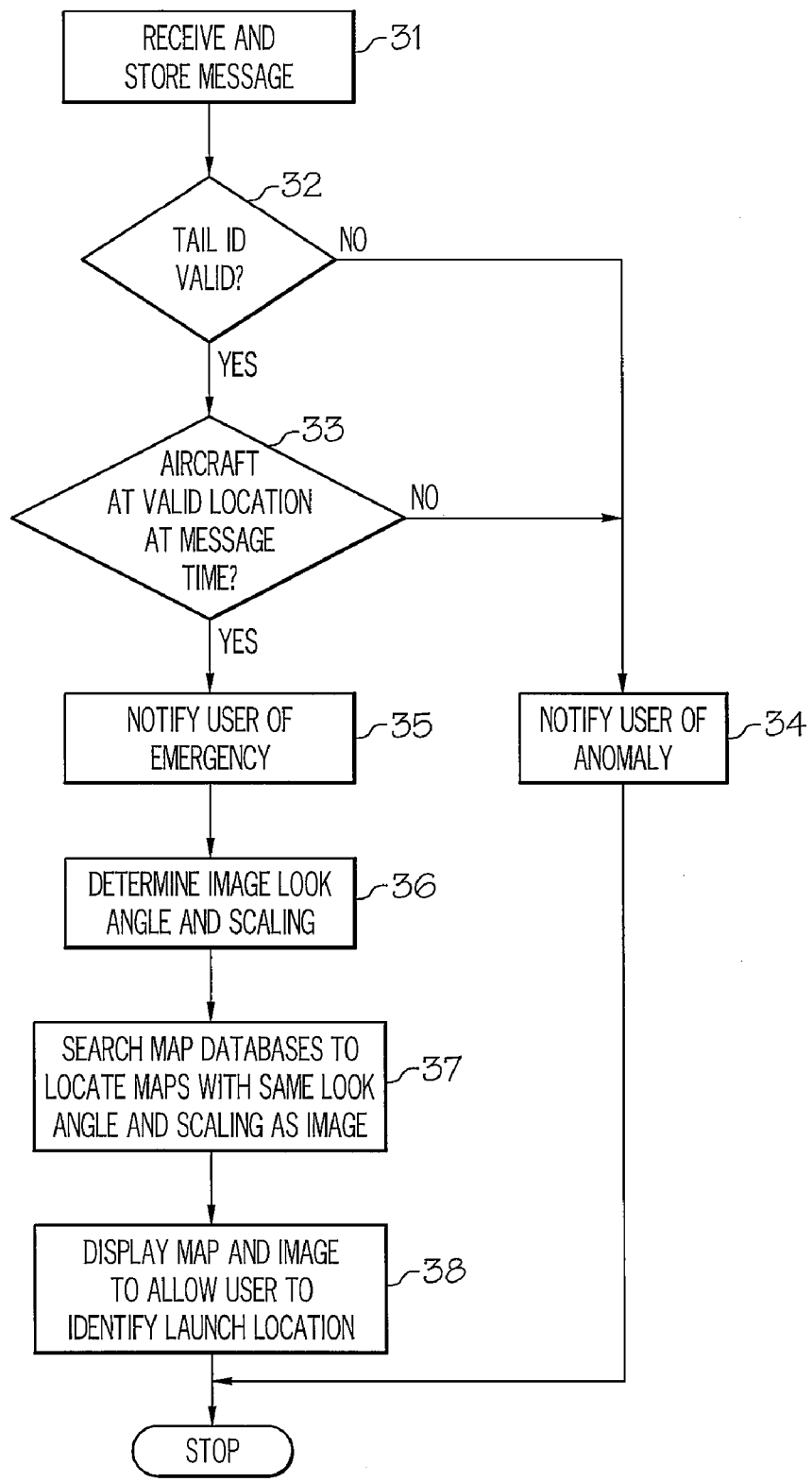
FIG. 3 is a high-level logic flow diagram of a method for processing information captured by the method from FIG. 2 in order to identify a location from which a hostile missile was launched, in accordance with a preferred embodiment of the present invention.

Referring now to FIG. 3, there is depicted a high-level logic flow diagram of a method for processing information captured by the method from FIG. 2 in order to identify a location from which a hostile missile was launched at an aircraft, in accordance with a preferred embodiment of the present invention. After the receipt of a secured email message, as shown in block 31, a determination is made as to whether or not the tail number included within the secured email message is a valid tail number for the aircraft, as depicted in block 32. Such determination can be made by checking the tail number included within the secured email message against a database of all valid tail numbers maintained by the Federal Aviation Administration. If the tail number included within the secured email message is not a valid tail number, an error message is shown to notify user of an anomaly, as depicted in block 34.

However, if the tail number included within the secured email message is a valid tail number, another determination is made as to whether or not the aircraft was at a valid location at the time the secured email message was sent, as shown in block 33. Such determination can be made by checking the tail number included within the secured email message against a database of all current airborne aircrafts maintained by the Federal Aviation Administration. If the aircraft was not at a valid location at the time the secured email message was sent, an error message is shown to notify user of an anomaly, as depicted in block 34.

Otherwise, if the aircraft was at a valid location at the time the secured email message was sent, a message is shown to notify user of the emergency, as shown in block 35. The video images contained in the secured email message are then analyzed to determine look angles and scaling of the video images, as depicted in block 36. The look angles can be determined by using the GPS center position locations of the video images, the latitude, longitude and altitude of the aircraft, the RPY orientation of the aircraft, and the bore sight angle of camera 15 (from FIG. 1). The scaling can be determined by using the altitude of the aircraft, the angle to image center, and the raw image resolution and zoom scale factor. Multiple map databases are then searched to locate maps with identical or similar look angles and scaling, as shown in block 37.

The located maps are subsequently displayed along with the corresponding video images to allow an user to identify an exact launch location of the hostile missile, as depicted in block 38. In order to assist the user during the identification process, the user can be provided with orientation functionalities such as map/image overlay with scalability and map/image overlay rotation with fine adjustments.

As has been described, the present invention provides a surveillance system for identifying locations from which hostile land-to-air missiles were launched at aircrafts.

It is also important to note that the present invention can be implemented in a computer system, and the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for identifying a location from which a hostile missile was launched at an aircraft, said method comprising:
   in response to a receipt of a message sent from an aircraft, wherein said message contains information regarding a hostile missile had been launched at said aircraft, determining whether or not a tail number contained within said message is a valid tail number for said aircraft;
   in response to a determination that a tail number contained within said message is a valid tail number for said aircraft, utilizing said tail number to determine whether or not said aircraft was at a valid location at the time said message was sent; and
   in response to a determination that said aircraft was at a valid location at the time said message was sent, retrieving pertinent information from said message for identifying the exact launch location of said hostile missile.

2. The method of claim 1, wherein said method further includes in response to a determination that a tail number contained within said message is not a valid tail number for said aircraft, notifying a user of an anomaly.

3. The method of claim 1, wherein said method further includes in response to a determination that said aircraft was not at a valid location at the time said message was sent, notifying a user of an anomaly.

4. The method of claim 1, wherein said retrieving pertinent information from said message further includes determining look angles and scalings of video images within said message.

5. The method of claim 4, wherein said method further includes searching a plurality of map databases to locate maps with similar look angles and scalings of said video images within said message.

6. The method of claim 5, wherein said method further includes displaying located maps to allow a user to identify a launch location at which said hostile missile was launched.

7. A computer usable medium having a computer program product for identifying a location from which a hostile missile was launched at an aircraft, said computer usable medium comprising:
   program code means for, in response to a receipt of a message sent from an aircraft, wherein said message contains information regarding a hostile missile had been launched at said aircraft, determining whether or not a tail number contained within said message is a valid tail number for said aircraft;
   program code means for, in response to a determination that a tail number contained within said message is a valid tail number for said aircraft, utilizing said tail number to determine whether or not said aircraft was at a valid location at the time said message was sent; and
   program code means for, in response to a determination that said aircraft was at a valid location at the time said message was sent, retrieving pertinent information from said message for identifying the exact launch location of said hostile missile.

8. The computer usable medium of claim 7, wherein said computer usable medium further includes program code means for, in response to a determination that a tail number contained within said message is not a valid tail number for said aircraft, notifying a user of an anomaly.

9. The computer usable medium of claim 7, wherein said computer usable medium further includes program code means for, in response to a determination that said aircraft was not at a valid location at the time said message was sent, notifying a user of an anomaly.

10. The computer usable medium of claim 7, wherein said program code means for retrieving pertinent information from said message further includes program code means for determining look angles and scalings of video images within said message.

11. The computer usable medium of claim 10, wherein said computer usable medium further includes program code means for searching a plurality of map databases to locate maps with similar look angles and scalings of said video images within said message.

12. The computer usable medium of claim 11, wherein said computer usable medium further includes program code means for displaying located maps to allow a user to identify a launch location at which said hostile missile was launched.

13. A system for identifying a location from which a hostile missile was launched at an aircraft, said system comprising:

means for, in response to a receipt of a message sent from an aircraft, wherein said message contains information regarding a hostile missile had been launched at said aircraft, determining whether or not a tail number contained within said message is a valid tail number for said aircraft;

means for, in response to a determination that a tail number contained within said message is a valid tail number for said aircraft, utilizing said tail number to determine whether or not said aircraft was at a valid location at the time said message was sent; and means for, in response to a determination that said aircraft was at a valid location at the time said message was sent, retrieving pertinent information from said message for identifying the exact launch location of said hostile missile.

14. The system of claim 13, wherein said system further includes means for, in response to a determination that a tail number contained within said message is not a valid tail number for said aircraft, notifying a user of an anomaly.

15. The system of claim 13, wherein said system further includes means for, in response to a determination that said aircraft was not at a valid location at the time said message was sent, notifying a user of an anomaly.

16. The system of claim 13, wherein said means for retrieving pertinent information from said message further includes program code means for determining look angles and scalings of video images within said message.

17. The system of claim 16, wherein said system further includes means for searching a plurality of map databases to locate maps with similar look angles and scalings of said video images within said message.

18. The system of claim 17, wherein said system further includes means for displaying located maps to allow a user to identify a launch location at which said hostile missile was launched.

\* \* \* \* \*